INVENTORS
WILLIAM MARTIN BLAGDEN
HERBERT PERKINS
BY Norris & Bateman
ATTORNEYS

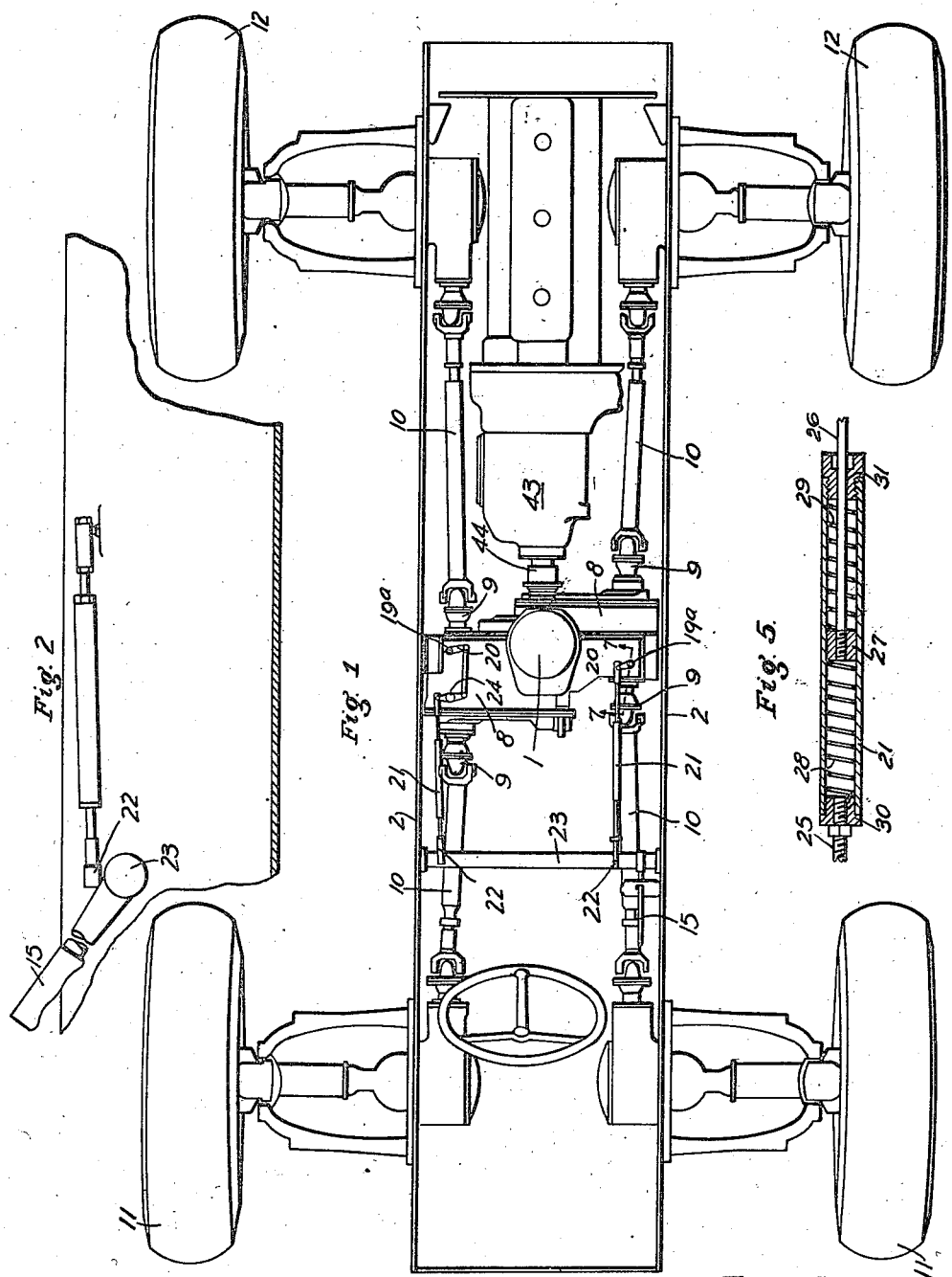

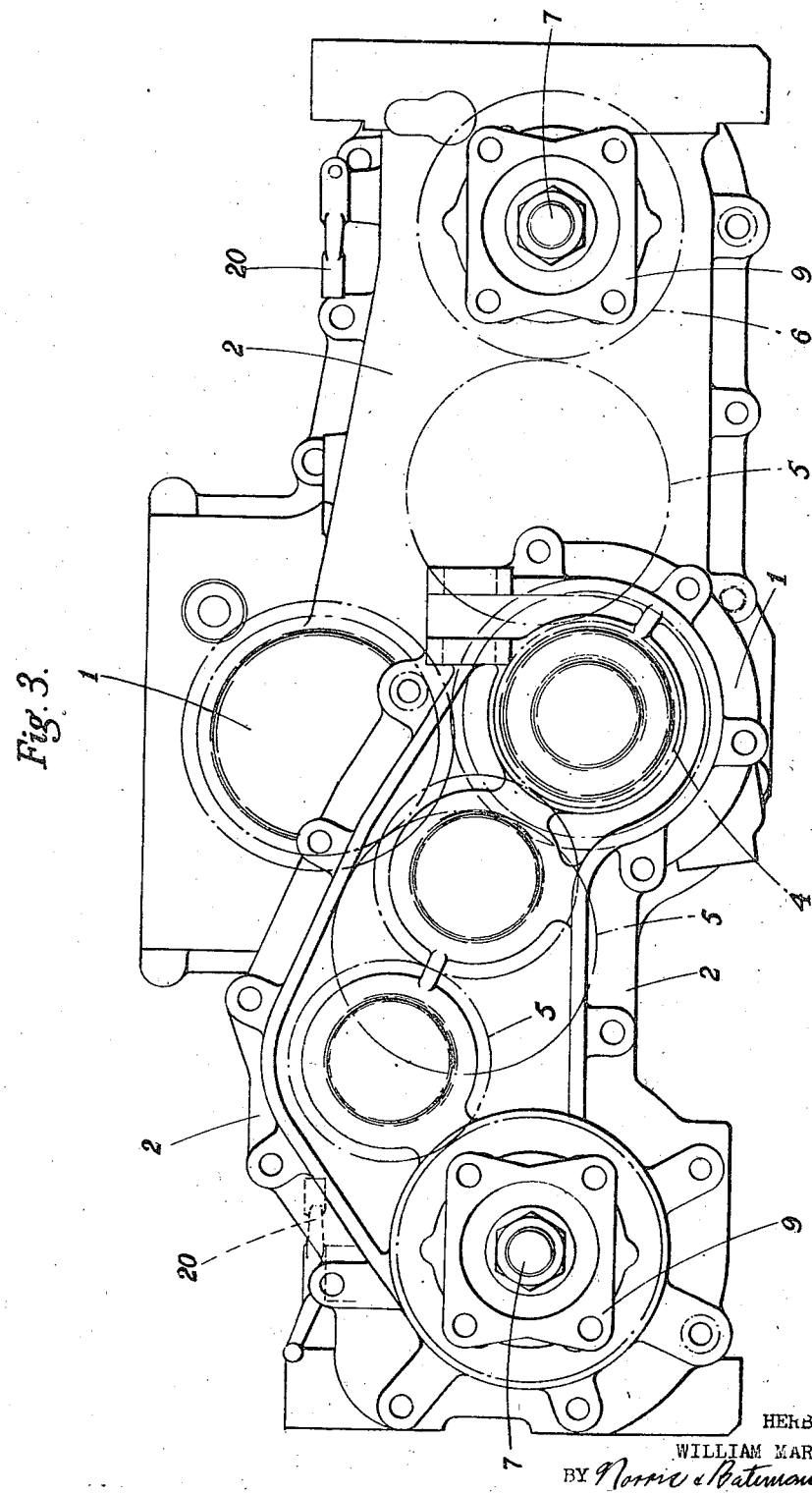

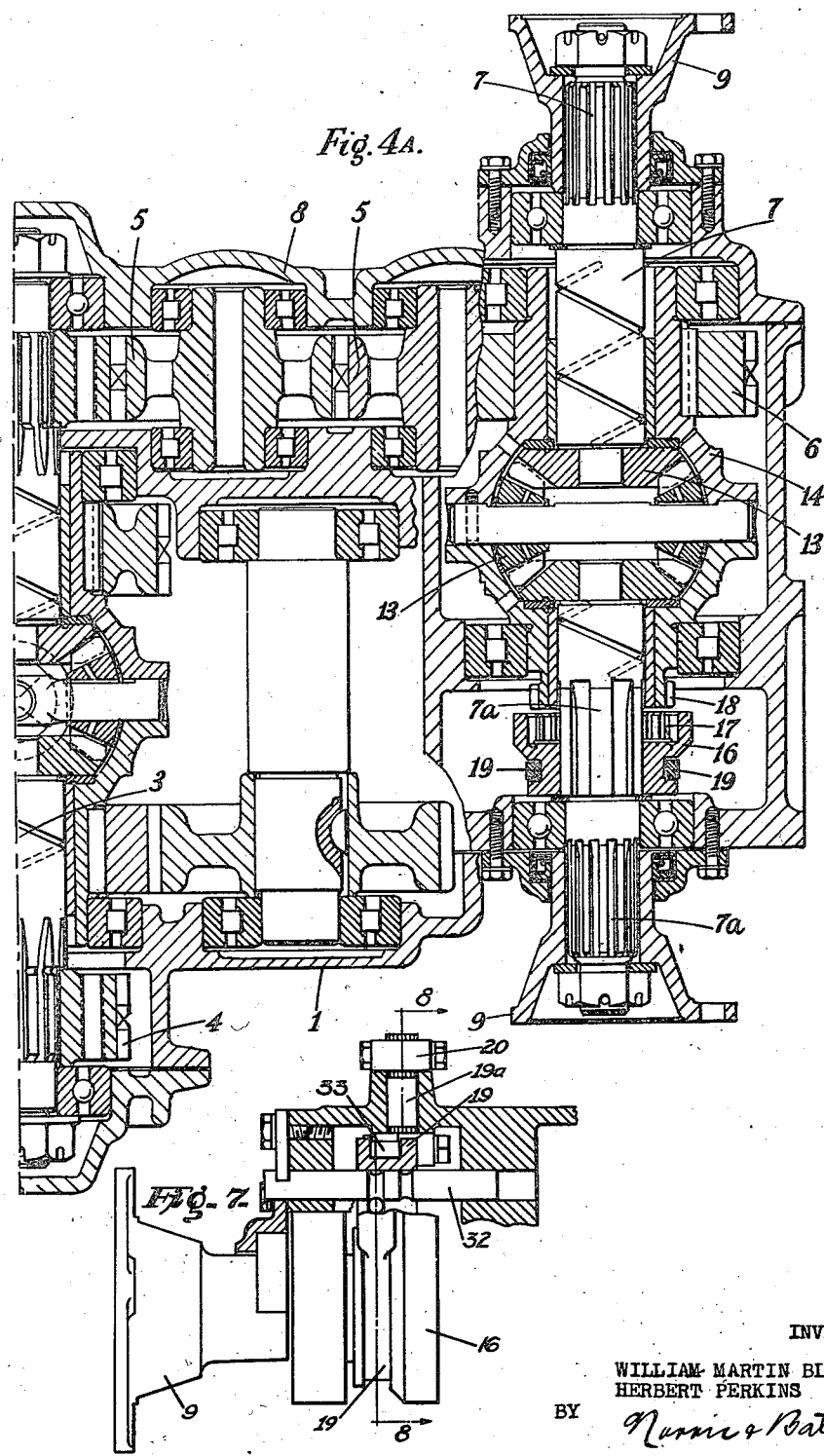

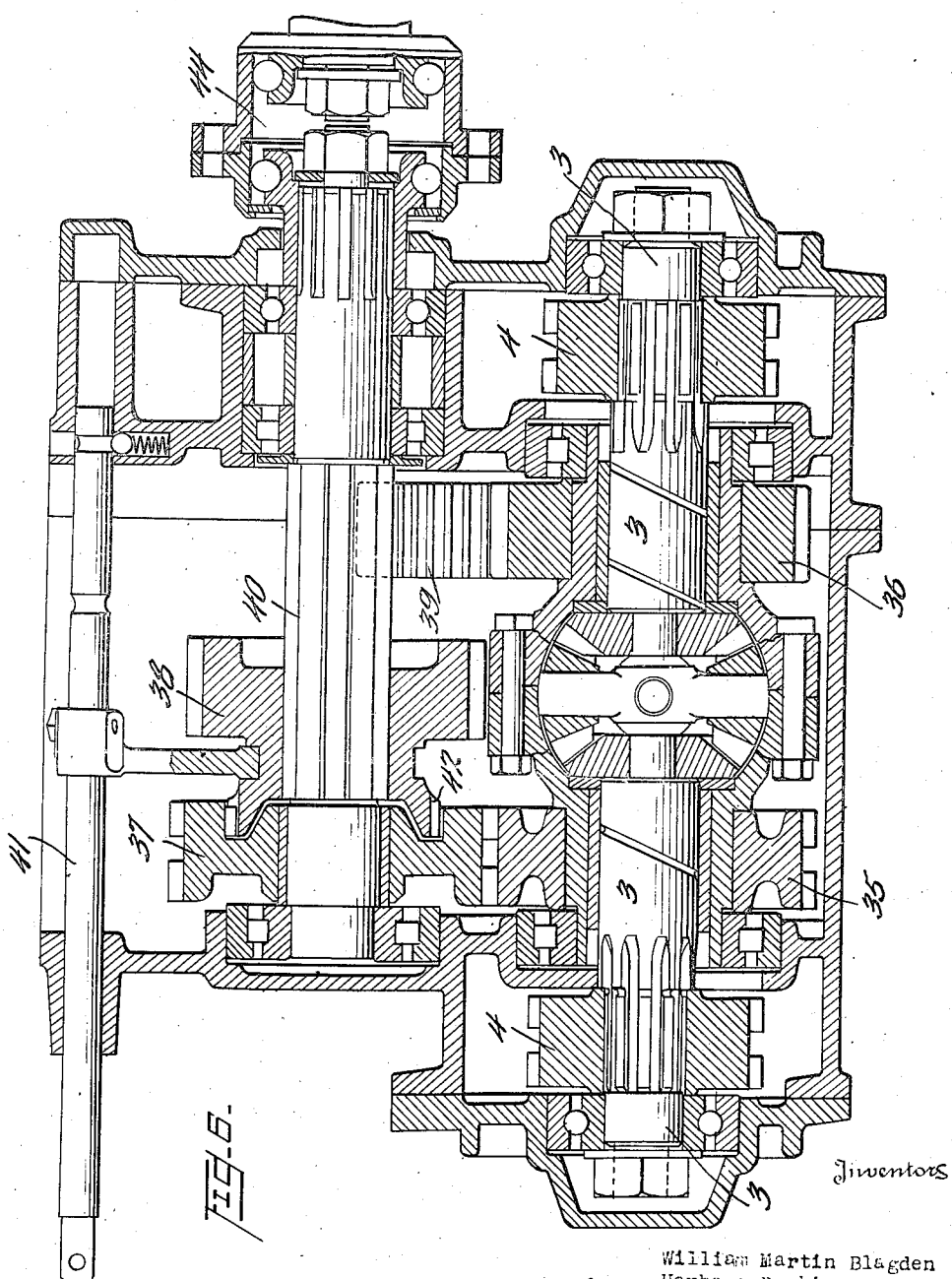

Patented Jan. 12, 1943

2,308,351

UNITED STATES PATENT OFFICE 2,308,351

TRANSMISSION MECHANISM FOR MOTOR VEHICLES

William Martin Blagden, Farnborough, and Herbert Perkins, Solihull, England, assignors to The Birmingham Small Arms Company Limited, Birmingham, England, a British company Application May 9, 1941, Serial No. 392,760
In Great Britain May 13, 1940

5 Claims. (Cl. 180—49)

This invention relates to transmission mechanism for motor vehicles of the kind described and claimed in United States Patent No. 2,219,249 having a conventional change speed and reverse gear box, the output shaft of which is coupled direct to the drive shaft of a combined differential, reverse and transfer mechanism disposed centrally between the side members of the vehicle chassis, the drive shaft being disposed longitudinally of the vehicle and carrying forward and reverse pinions or dog clutches which can be selectively coupled to drive differential gear shafts parallel with the drive shaft and connected by gearing transversely disposed in relation to the vehicle, to longitudinal propeller shafts arranged at opposite sides of the vehicle and to which the wheel drives are connected, the arrangement being such as to enable the front and rear wheels to be driven in either direction.

In the aforesaid system the central differential splits the drive between the off-side and near-side of the vehicle while the off-side front and rear wheels are positively coupled by a drive which is geared to one side of the central differential. The near-side front and rear wheels are also positively coupled by a drive which is geared to the other side of the central differential.

In transmission mechanism such as previously described the direct coupling of the drive of the front and rear wheels of the vehicle entails slip between the said wheels and the ground under conditions where the steering of the front wheels without steering the rear wheels, or vice versa, causes the one wheel to travel in the path of a circle of larger radius than the other wheel. This condition of slip imposes a drag load on the wheels when operating on hard roads which may react on the steering of the vehicle and result in difficulty in operating the steering mechanism, and also increases the rate of tyre wear.

The object of the invention is to provide means for use under certain conditions which are adapted to permit the front wheels to run at speeds different from the rear wheels, thus facilitating the steering of the vehicle, reducing the rate of tyre wear when running on hard roads, and adapted to provide equal torque to the four wheels.

The present invention consists in the provision and use in combination with a power transmission system as described in the aforesaid United States Patent No. 2,219,249, of two specially adapted outer differentials, one of which is incorporated in the drive or output shaft between the off-side front and rear wheels, while the other is incorporated in the drive or output shaft between the near-side front and rear wheels.

The invention further consists in means under manual control of the driver whereby the aforesaid specially adapted differentials may be locked out of action and subsequently unlocked when so desired.

In order that the invention may be clearly understood certain embodiments thereof will now be described by way of example with reference to the accompanying drawings, in which:

Figure 1 is a skeleton plan view of a four-wheeled vehicle embodying a transmission mechanism in accordance with the invention.

Figure 2 is a side elevation, on an enlarged scale, of the central part of Figure 1.

Figures 3 and 4 show respectively a front elevation and a sectional plan view, on an enlarged scale, of the transmission mechanism as shown diagrammatically in Figure 1.

Figure 4A is a sectional plan view complemental to Fig. 4.

Figure 5 is a longitudinal section, on an enlarged scale, of the spring loaded link mechanism.

Figure 6 is a central vertical longitudinal section of the transmisison mechanism.

Figure 7 is a detail vertical section, on an enlarged scale, taken on the line 7—7 in Fig. 1.

Figure 4:
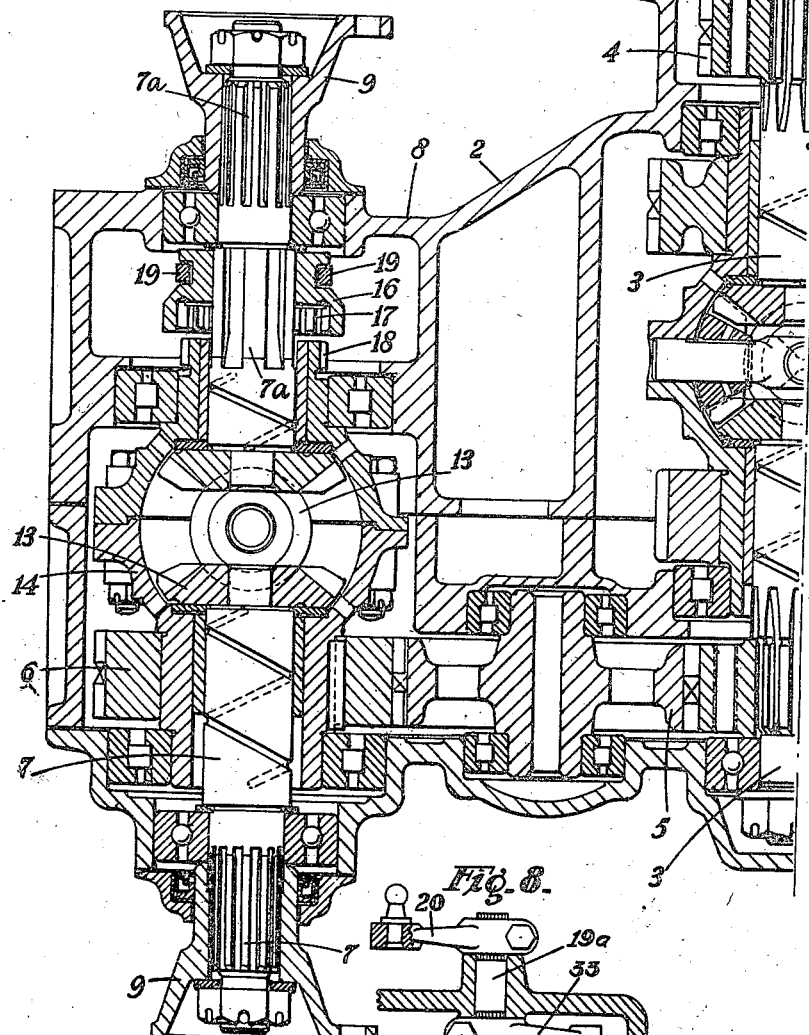

According to one convenient mode of carrying the invention into effect in its application to power transmission mechanism of the kind hereinbefore referred to wherein the transmission mechanism comprises a combined differential reverse and transfer gearing which is formed into a single unit 1 adapted to be mounted between the longitudinal side members 2 of the frame of the vehicle, and wherein the differential gear shafts 3 have mounted on the ends thereof gear or chain wheels 4 coupled by intermediate gear wheels 5 or chains to gear or chain wheels 6 on output shafts 7 mounted in transverse extensions 8 formed or fitted to the main casing, said output shafts 7 being disposed longitudinally in relation to the frame of the vehicle and provided at each end with a coupling 9 for attachment to propeller shafts 10 arranged to drive the front and rear wheels 11 and 12, we incorporate with the output shafts 7 on the near-side and the off-side of the vehicle, outer differentials 13 adapted to split the drive between the front and rear wheels 11 and 12 respectively and permit the near-side and off-side front wheels 11 of the vehicle to run at speeds different from the off-side and near-side rear wheels 12 respectively when the vehicle is steered. The said outer differentials 13 are also adapted to divide the driving torque equally between the four wheels of the vehicle.

As shown in Fig. 6, the central differential gear shafts 3 are driven in forward and reverse directions respectively by gears 35 and 36 which are fixed to the casing of this differential, and a pinion 37 which meshes with the gear 35 and a pinion 38 which is adapted to mesh with an intermediate idler gear 39 which meshes with the gear 36. The pinion 38 is slidable on a driving shaft 40 by a rod or bar 41 which may be operated by means such as that shown in the aforesaid patent, so that pinion 38 may either couple the shaft 40 to pinion 37 by engaging a dog clutch 42 for forward drive, or may disengage such clutch and engage pinion 38 with gear 39 for reverse drive. The drive shaft 40 is coupled direct to the output shaft of the main gear box 43 by a coupling 44.

The casings 14 of the aforesaid outer differentials 13 have mounted on one end thereof the gear or chain wheels 6 coupled by the intermediate gear wheels 5 or chains to gear or chain wheels 4 on the ends of the central differential gear shafts 3.

The aforesaid outer differentials 13 are adapted to be locked by manual operation of a lever 15 by the driver of the vehicle, when driving conditions are such that one or more wheels lose grip of the ground and tend to spin, and such is effected by the provision of a sliding clutch 16 mounted on the driven part 7a of the output shafts 7, said clutch having formed therein teeth or dogs 17 adapted to engage with teeth or dogs 18 formed on the casing 14 of the outer differential, said clutch, when moved to its engaged or operative position, being adapted to lock together the two parts 7, 7a of said output shafts and make inoperative the outer differentials 13 incorporated therewith. In Figures 4 and 4A, the aforesaid sliding clutches 16 are shown in the disengaged or free position.

Figure 8:
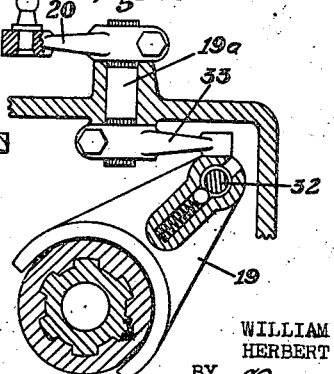
Figure 8 is a section taken on the line 8—8 in Fig. 7.

The means for operating the aforesaid sliding dog clutches 16 in one convenient arrangement comprises forks 19 which may conveniently be carried on shafts 32 mounted in the casing of the outer differentials, as shown in Figs. 7 and 8, said forks being operated by levers 33 fixed to short vertically disposed shafts 19a mounted in the differential casing, the said shafts 19a having mounted on their outer ends levers 20 which are connected, as shown in Fig. 1, by means of spring loaded links 21 to short arms 22 fixed to a cross shaft 23 mounted transversely between the side members 2 of the chassis frame, the said cross shaft 23 having keyed thereon the operating lever 15 arranged and adapted for manual operation by the driver. In order to obtain the appropriate simultaneous movement of the sliding clutches 16, the lever 20 on one side of the vehicle is connected directly to the spring loaded link 21, while on the other side the connection is through intermediate lever and link mechanism 24.

The aforesaid spring loaded links 21, as seen in Figure 5, comprise a rod 25 fixed in one end of a tubular member, and a rod 26 slidably mounted in the other end of said tubular member and having fixed on its inner end an abutment 27 on the opposite sides of which react springs 28 and 29, the outer ends of said springs reacting respectively on abutments 30 and 31 mounted in the outer ends of the aforesaid tubular member.

The aforesaid links 21 are adapted to be spring loaded in both directions in order that the manual lever 15 may be operated by the driver under all circumstances, that is assuming the teeth 17 on the sliding clutch member 16 are not in suitable relative positions to slide into engagement with the clutch teeth or dogs 18 on the casings 14 of the outer differentials 13 when said manual lever 15 is operated, movement being taken up in deflecting the springs of the aforesaid spring loaded links 21, and this deflection causes a spring load to be imposed on the sliding dogs, which will cause said dogs to slide into engagement when suitable relative positions have been attained for meshing. Alternatively, if the sliding dogs are already engaged, the opposite movement of the manual lever 15 will impose spring loads on the sliding dogs 17 and will cause them to disengage as soon as any load imposed by the drive is sufficiently reduced.

It will be readily appreciated that if the driving conditions are such that one or more wheels lose grip of the ground and tend to spin, the outer differentials 13 are thus adapted to be locked and made inoperative at will by manual operation of the aforesaid lever 15 by the driver of the vehicle.

Having thus described our invention, what we claim as new and desire to secure by Letters Patent is:

1. In a motor vehicle having a main frame having longitudinal side members, front and rear wheels, a main change speed gear box, parallel propeller shafts disposed longitudinally at opposite sides of the vehicle and connected to the front and rear wheels at the respective sides of the vehicle for driving them, a combined differential, reverse and transfer gearing mounted centrally between the longitudinal side members of the frame and comprising a driving shaft disposed longitudinally of the vehicle and coupled direct to the output shaft of the main gear box, forward and reverse pinions mounted on said driving shaft, differential gearing including differential gear shafts disposed parallel to said driving shaft, means for selectively coupling said pinions to said differential gear shafts, gearing disposed transversely of the vehicle and connecting said differential gear shafts to the respective longitudinal propeller shafts for driving them, outer differential gearing incorporated with the propeller or output shafts in the drive between the front and rear wheels of the vehicle, and means under manual control for causing said outer differential gearing to act non-differentially.

2. A motor vehicle according to claim 1, wherein said differential gearing incorporated with the propeller or output shafts comprises two outer differential gears arranged to split the drive between the off-side front and rear wheels and the near-side front and rear wheels, and wherein said means under manual control comprises means for locking and unlocking said gearing.

3. A motor vehicle according to claim 1, wherein said propeller shafts are divided, and said outer differential gearing for each propeller shaft comprises a casing freely mounted on one part of the respective propeller shaft and having a gear wheel thereon connected by intermediate gears to said combined differential, reverse and transfer gearing, and wherein said means under manual control comprises a slidable clutch member provided with clutch teeth engageable with clutch teeth on the casing of the respective outer differential gearing for clutching the casing of said outer differential gearing to the other part of the respective propeller shaft.

4. A motor vehicle according to claim 1, wherein said propeller shafts are divided, and said outer differential gearing for each propeller shaft comprises a casing freely mounted on one part of the respective propeller shaft and having a gear wheel thereon connected by intermediate gears to said combined differential, reverse and transfer gearing, and wherein said means under manual control comprises a slidable clutch member provided with clutch teeth engageable with clutch teeth on the casing of the respective outer differential gearing for clutching the casing of said outer differential gearing to the other part of the respective propeller shaft, and lever and link mechanism for actuating said slidable clutch members.

5. A motor vehicle according to claim 1, wherein said propeller shafts are divided, and said outer differential gearing for each propeller shaft comprises a casing freely mounted on one part of the respective propeller shaft and having a gear wheel thereon connected by intermediate gears to said combined differential, reverse and transfer gearing, and wherein said means under manual control comprises a slidable clutch member provided with clutch teeth engageable with clutch teeth on the casing of the respective outer differential gearing for clutching the casing of said outer differential gearing to the other part of the respective propeller shaft, and levers and spring loaded links for actuating said slidable clutch members.

WILLIAM MARTIN BLAGDEN.
HERBERT PERKINS.